(12) United States Patent
Protz et al.

(10) Patent No.: US 12,727,730 B2
(45) Date of Patent: Sep. 8, 2026

(54) FLOOR CLEANING MACHINE

(71) Applicant: Hako GmbH, Bad Oldesloe (DE)

(72) Inventors: Carsten Protz, Altenkrempe (DE); Bertram Ulrich, Lübeck (DE); Richardo Ruiz-Porath, Bad Oldesloe (DE)

(73) Assignee: Hako GmbH, Bad Oldesloe (DE)

(*) Notice: Subject to any disclaimer, the term of this patent is extended or adjusted under 35 U.S.C. 154(b) by 842 days.

(21) Appl. No.: 17/851,604

(22) Filed: Jun. 28, 2022

(65) Prior Publication Data

US 2022/0409003 A1 Dec. 29, 2022

(30) Foreign Application Priority Data

Jun. 29, 2021 (DE) ........................ 102021116685.3

(51) Int. Cl.

| | |
|---|---|
| ***A47L 11/40*** | (2006.01) |
| ***A47L 11/30*** | (2006.01) |
| ***F16C 11/04*** | (2006.01) |

(52) U.S. Cl.

CPC ......... *A47L 11/4075* (2013.01); *A47L 11/305* (2013.01); *A47L 11/4038* (2013.01); *A47L 11/4061* (2013.01); *F16C 11/04* (2013.01)

(58) Field of Classification Search

CPC .... A47L 11/40; A47L 11/4075; A47L 11/292; A47L 11/293; A47L 11/30; A47L 11/302;

(Continued)

(56) References Cited

U.S. PATENT DOCUMENTS 1,982,910 A * 12/1934 Forbes .................... A47L 13/24 403/100
10,349,797 B2 7/2019 Moser et al.

(Continued)

FOREIGN PATENT DOCUMENTS

CN 101884514 A 11/2010
CN 106793910 A 5/2017

(Continued)

OTHER PUBLICATIONS

Chinese Office Action for Chinese Patent Application No. 202210742053.5 dated Sep. 2, 2024 (6 pages).

(Continued)

*Primary Examiner* — Brian D Keller
*Assistant Examiner* — John C Merino
(74) *Attorney, Agent, or Firm* — REISING ETHINGTON, P.C.

(57) ABSTRACT

A floor cleaning machine with a base, which has a driven cleaning element, and an operating bar that is pivotably attached to the base via a joint and extends between a proximal end and an actuating end. The joint includes a bellows, which is coupled at its opposite ends to the base and the operating bar, a first supporting element, which is arranged inside the bellows and is attached to and points away from the base, and a second supporting element, which is arranged inside the bellows and is attached to and points away from the proximal end of the operating bar. A free end of one of the first and second supporting elements has a projection, while a free end of the other of the first and second supporting elements has a receiving recess that receives the projection and guides it for pivoting movement.

15 Claims, 11 Drawing Sheets

(58) Field of Classification Search
CPC .......................... A47L 11/305; A47L 11/4013; A47L 11/4016; A47L 11/4061; A47L 11/4063; A47L 11/4066; A47L 11/408; A47L 11/4083; A47L 11/4088; A47L 11/161; A47L 11/4077; A47L 11/4069; A47L 11/4005; A47L 11/28; A47L 11/20; A47L 11/4027; E01H 1/053; E01H 1/0845; E01H 1/101; E01H 1/103; B25G 3/38
See application file for complete search history.

(56) References Cited

U.S. PATENT DOCUMENTS

| | | | | |
|---|---|---|---|---|
| 11,202,546 | B2 | 12/2021 | Kasper | |
| 11,445,876 | B2 | 9/2022 | Kim et al. | |
| 2015/0208893 | A1* | 7/2015 | Stephens | B25G 1/06 134/6 |
| 2017/0332853 | A1 | 11/2017 | Nam et al. | |
| 2022/0211239 | A1* | 7/2022 | Moro | A47L 11/4083 |

FOREIGN PATENT DOCUMENTS

| | | | |
|---|---|---|---|
| CN | 106998972 | A | 8/2017 |
| CN | 111031872 | A | 4/2020 |
| EP | 2250957 | A2 | 11/2010 |
| WO | WO2016/022270 | A1 | 2/2016 |
| WO | WO2019219580 | A1 | 11/2019 |

OTHER PUBLICATIONS

European Search Report mailed Nov. 28, 2022 for corresponding European Application No. 22181921.2 filed Jun. 29, 2022.

* cited by examiner

FLOOR CLEANING MACHINE

CROSS-REFERENCE TO RELATED APPLICATIONS

This application claims the benefit of German Patent Application No. 10 2021 116 685.3 filed Jun. 29, 2021, the disclosure of which is incorporated by reference as if fully set forth in detail herein.

FIELD

The present disclosure relates to a floor cleaning machine, in particular a scrubber dryer, having a cleaning element arrangement for engagement with a floor surface to be cleaned.

BACKGROUND

This section provides background information related to the present disclosure which is not necessarily prior art.

Floor cleaning machines commonly include a base and a cleaning element arrangement, which is arranged on an underside of the base, is held so as to be movable, is driven and has driven brushes which can engage with a floor surface to be cleaned. In this case, the brushes are used, in particular, for scrubbing a floor surface. Furthermore, the floor cleaning machine comprises a drive motor, preferably arranged on the base, for driving the cleaning element arrangement, and an operating bar, which is attached to the base, preferably movably, in particular pivotably, via a joint, for guiding and actuating the floor cleaning machine. In this case, the machine can be guided and actuated directly by a user or can be attached to a chassis and actuated from there.

WO 2020/234904 A1, for example, discloses a floor cleaning machine having a base and an operating bar which extends away therefrom and is connected to the base via a joint. Furthermore, two cleaning elements driven to rotate in opposite directions are provided on a base, the axes of rotation of said cleaning elements being inclined relative to one another with respect to a vertical. This ensures that when the two cleaning elements rotate, a thrust is exerted on the base of the floor cleaning machine. However, because the cleaning elements are inclined relative to one another, the cleaning effect is not uniform in the region of the rotationally driven cleaning elements. On the contrary, the cleaning elements rest less strongly against the floor surface to be cleaned at the outer edge, with the result that the cleaning effect there is less. Moreover, the thrust produced continuously by the rotationally driven cleaning elements is frequently disadvantageous during operation. This is because a user must apply a considerable force to move the floor cleaning machine in other directions that deviate from the direction of thrust. In this case, the joint between the base and the operating bar can be designed in such a way that a sleeve made of an elastic material with a steel coil embedded therein is provided.

However, a joint of such a design has proven to be disadvantageous since, although a torque parallel to a vertical axis extending perpendicularly from the floor surface to be cleaned can thereby also be exerted on the base by the operating bar, it is not possible also to exert a pressure along the longitudinal axis of the operating bar in the direction of the base. On the contrary, with the construction described in the prior art, there is no guidance for the operating bar relative to the base and it cannot carry out a defined movement.

SUMMARY

This section provides a general summary of the disclosure, and is not a comprehensive disclosure of its full scope or all of its features.

It is one object of the present disclosure to provide a floor cleaning machine having a base and an operating bar which is pivotably connected to the latter, wherein the joint is of simple construction and, furthermore, allows forces acting in the direction of the longitudinal axis of the operating bar to be transmitted to the base.

According to the disclosure, this object can be achieved by a floor cleaning machine having a base and an operating bar, wherein the base has a cleaning element arrangement with at least one driven cleaning element, on which engagement elements are provided, wherein the cleaning element is designed to engage, by means of the engagement elements provided thereon, with a floor surface to be cleaned, with the result that, when they engage with the floor surface, free ends of the engagement elements are arranged in a cleaning plane.

The operating bar may extend along a longitudinal axis between a proximal end and an actuating end and is pivotably attached to the base via a joint in such a way that it can be pivoted in any desired direction relative to the base, wherein the joint is configured in such a way that a torque is exerted on the base when the operating bar is rotated about its longitudinal axis, said torque being oriented in such a way as to cause the base to pivot about a vertical axis which runs perpendicularly to the cleaning plane.

The joint may include a sleeve-shaped bellows, which extends between a first and a second end, the first end of which is connected to the base and the second end of which is connected to the operating bar, a first supporting element, which is arranged inside the bellows and is attached to the base, pointing away therefrom, and a second supporting element, which is arranged inside the bellows and is attached to the proximal end of the operating bar, pointing away therefrom, wherein the free end of one of the first and second supporting elements has a convex spherical shell-shaped projection and the free end of the other of the first and second supporting elements has a concave spherical shell-shaped receiving recess, and wherein the receiving recess is designed to receive the projection.

The floor cleaning machine can have a base and an operating bar connected to the latter via a joint, wherein a cleaning element arrangement comprising at least one driven cleaning element is provided on the base, wherein the cleaning element furthermore has engagement elements, which are provided for the purpose of engaging with the floor surface to be cleaned over which the floor cleaning machine is moved.

The at least one cleaning element can be, inter alia, a brush element which has bristles that extend away from a cleaning body and whose free ends are, in turn, intended to engage with the floor surface to be cleaned. However, other embodiments of the cleaning elements are also conceivable, in which the engagement elements are designed, for example, as pads, and therefore the present disclosure is not restricted to cleaning elements in the form of brush elements.

The engagement elements provided on the at least one cleaning element may be constructed in such a way that their free ends, which are provided for engagement with the floor surface to be cleaned, are arranged in a common cleaning plane when the cleaning element engages with a floor surface.

Furthermore, in the floor cleaning machine according to the disclosure, a joint can be provided via which the base is pivotably connected to the operating bar extending along a longitudinal axis, thus enabling the operating bar to be pivoted in any desired direction relative to the base. In addition, the joint is also designed in such a way that rotation of the operating bar about its longitudinal axis exerts on the base a torque which runs perpendicularly to the cleaning plane. Since the cleaning plane is defined by the free ends of the engagement elements on the at least one cleaning element when the floor cleaning machine is resting on a floor surface to be cleaned, this means that the joint is configured in such a way that rotation of the operating bar is associated with a rotational movement of the base on the floor surface to be cleaned. Thus, the user has the possibility of controlling the alignment of the base on the floor surface to be cleaned with the aid of the operating bar.

The joint can be configured in such a way that it has a sleeve-shaped bellows in which a first supporting element and a second supporting element are arranged, wherein the first supporting element is attached to the base in a manner pointing away from it, while the second supporting element is attached to the proximal end of the operating bar, likewise pointing away from it. One of the two supporting elements is provided as a convex spherical shell-shaped projection, while the other supporting element is designed as a concave spherical shell-shaped receiving recess. In this case, the projection and the receiving recess are configured in such a way that the projection is received in the receiving recess, ensuring that it is guided for a pivoting movement.

The latter means that the projection and the receiving recess are dimensioned in such a way that, when the projection is received in the receiving recess, the latter guides the projection in a manner such that the operating bar has to be pivoted along a predetermined path relative to the base in order for the projection to maintain contact in the receiving recess.

However, the projection and the receiving recess are not necessarily dimensioned in such a way that they cannot be detached from one another.

In situations where the projection and the receiving recess are provided on the base and the operating bar, the guiding of the operating bar on the base is ensured during a pivoting movement relative to the latter. This has the advantage, first of all, that a force exerted on the operating bar along its longitudinal axis is also transmitted to the base, thus enabling the user to transmit such forces to the base in a more defined manner in comparison with the prior art, ensuring better controllability of the base. Moreover, the guidance of the operating bar on a counter-surface formed by the projection or the receiving recess is associated with a more direct haptic connection between the user and the base during the operation of the machine according to the disclosure, making it easier to feel resistances which oppose a movement of the base over the floor surface to be cleaned and thus allowing more effective checking as to whether the cleaning operation is proceeding in the desired manner.

In a preferred embodiment, the first supporting element is provided with the convex spherical shell-shaped projection, while the second supporting element, which is provided on the operating bar, has the concave spherical shell-shaped receiving recess.

Furthermore, in an advantageous embodiment, at least one locking element can be provided on the operating bar, which locking element is movable relative to the operating bar between an engagement position and a release position, wherein a receiving section connected to the base is provided, and wherein the locking element and the receiving section are designed in such a way that, in the engagement position, the locking element can engage with the receiving section in a manner such that the operating bar is locked relative to the base and is prevented from moving relative to the base, and that, in the release position of the locking element, the operating bar can be moved relative to the base. As a result, it is possible for the operating bar to be fixed in a predetermined locking position relative to the base. This makes it possible to design the floor cleaning machine with a parking position from which the operating bar cannot be accidentally pivoted.

As a further preference, this parking position is designed in such a way that the longitudinal axis of the operating bar extends substantially perpendicularly to the cleaning plane, that is to say the plane in which the free ends of the engagement elements of the cleaning element are arranged, when the floor cleaning machine engages with a floor surface to be cleaned. In particular, if the operating bar is arranged perpendicularly to the engagement plane of the cleaning element in the parking position, it is ensured that the machine cannot tilt in this position. If the machine additionally has wheels, e.g. at an edge which faces a suction foot attached to the base for sucking up liquid from the floor surface to be cleaned, the floor cleaning machine can be tilted as a whole in the parking position by pivoting the operating bar and can then be rolled over the floor.

As a further preference, the operating bar can have an actuating element at the actuating end, which element is coupled to the at least one locking element in such a way that the locking element is moved from the engagement position into the release position by a movement of the actuating element. In this way, a user can release the operating bar from the parking or locking position in a simple way.

In a preferred embodiment of the present disclosure, the at least one locking element is movable relative to the operating bar, transversely with respect to the longitudinal axis of the latter, between the engagement position and the release position.

In this preferred embodiment, the second supporting element can be held on the operating bar in such a way as to be movable in the direction of the longitudinal axis between a first position and a second position, wherein it engages with the at least one locking element in such a way that the locking element is moved out of the engagement position into the release position when the second supporting element moves out of the first position into the second position. The supporting element thus has the effect that the at least one locking element is disengaged from the receiving section when the supporting element is moved along the longitudinal axis. The supporting element thus additionally serves to release the locking of the operating bar with respect to the base.

In this case, it is particularly preferred if the actuating element is connected to the second supporting element, thus enabling the second supporting element to be moved out of the first position into the second position by a movement of the actuating element.

It is furthermore preferred if the second supporting element is further away from the actuating end of the operating bar in the first position than in the second position.

Furthermore, the second supporting element can be preloaded along the longitudinal axis of the operating bar in a direction away from the actuating end into the first position, while first preloading means are provided, which preload the first and second ends of the bellows away from one another. This construction ensures that the second supporting element must first be brought into a second position against the action of corresponding preloading means in order to bring the locking element into its release position, which is further away from the projection, it also being necessary to exert a force for this purpose. However, when the locking element is released with respect to the receiving section, the first preloading means cause the operating bar and thus the second supporting element to move away from the base, with the result that the locking element is also no longer opposite the receiving section. This makes it possible for the second supporting element, as a result of its preloading, to be pushed once again in the direction of the projection towards the first position and to come into contact with the latter in such a way that the receiving recess receives the projection.

In a preferred embodiment, it is also possible for the projection, which is preferably provided on the base, to be received in the receiving recess in such a way that the second supporting element and thus the operating bar are prevented from moving away from the first supporting element and thus from the base, in particular in the direction of the longitudinal axis of the operating bar. As a result, there is direct coupling of the operating bar and the base.

As a further preference, a locking element, which is movable along the longitudinal axis of the operating bar between an engagement position and a release position, can be provided on the operating bar, wherein the receiving section is provided as a recess, facing away from the base, in the projection, which recess is designed to receive the locking element when the latter is in the engagement position, wherein, in the engagement position, the locking element locks the operating bar relative to the base and prevents movement relative to the base. Such an embodiment has the advantage that the locking element can be moved easily, from a handle element provided on the actuating end of the operating bar, by means of a connection extending along the longitudinal axis. Actuation from a handle element can thus be easily implemented.

In this context, it is particularly preferred if an actuation element provided in the region of the handle element is coupled to the locking element in such a way that actuation of the actuation element brings about a movement of the locking element along the longitudinal axis towards the actuation end.

If, finally, second preloading means are provided which subject the operating bar to a force which drives the operating bar into a position in which the longitudinal axis runs perpendicularly to the cleaning plane, it is ensured that, particularly when the operating bar is inclined sharply, a user does not have to exert any large forces on the operating bar in order to hold it in this position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 9:
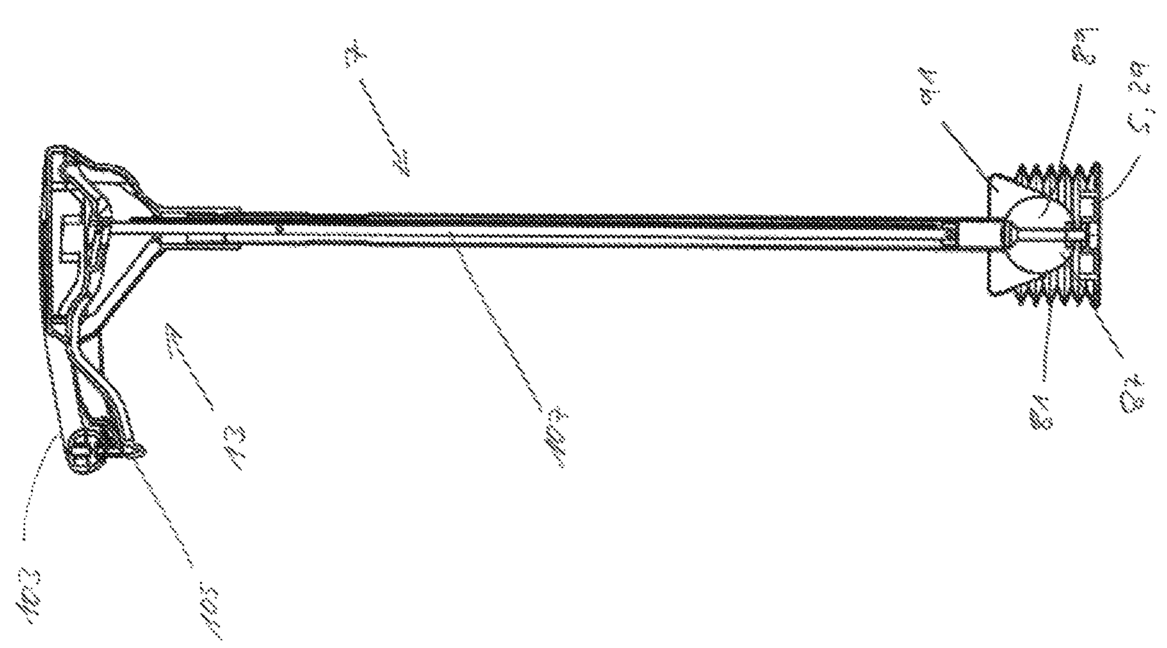
FIG. 9 is a sectional view of the section of the operating bar of a second exemplary embodiment of a floor cleaning machine, which is similar to that from FIG. 1.
Figure 10:
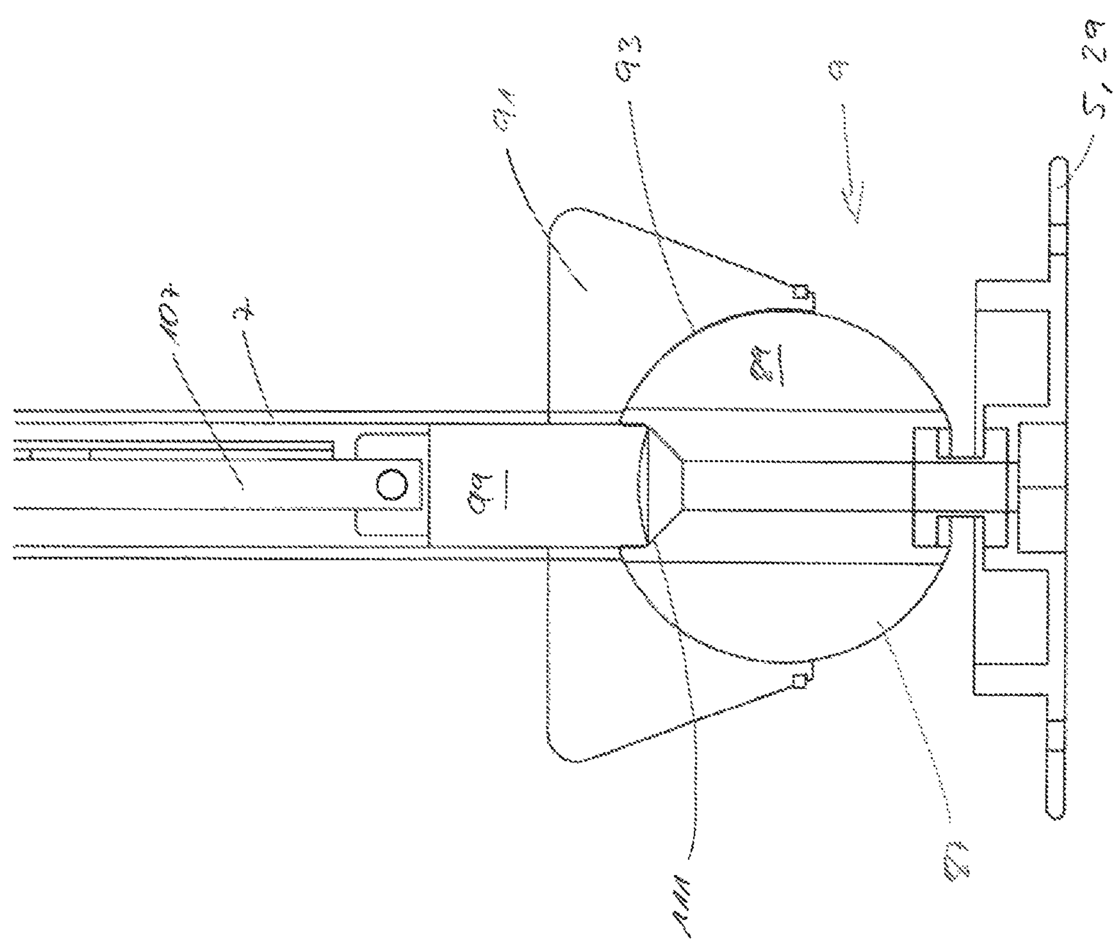
Figure 11:
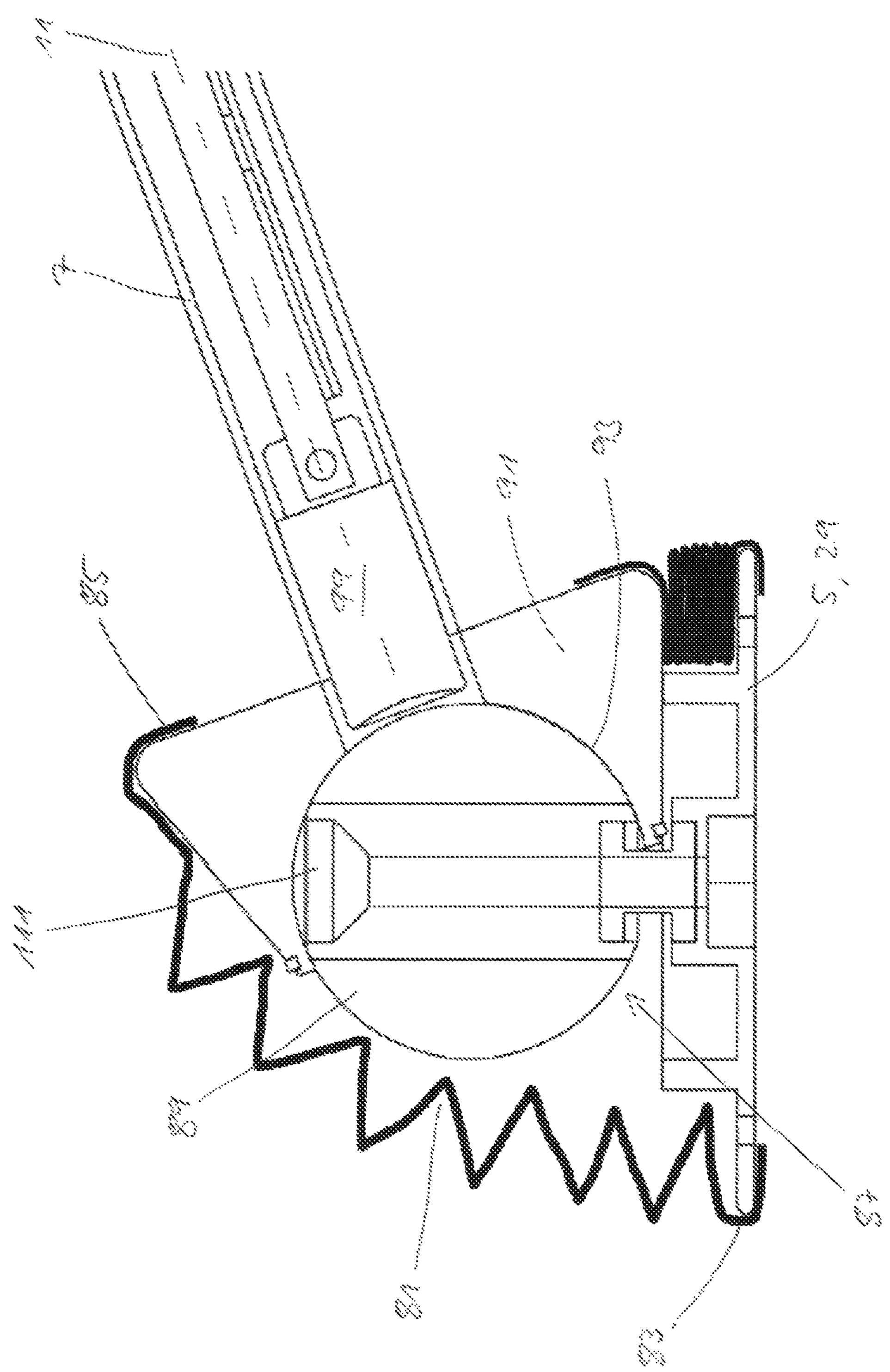

FIG. 10 is a sectional view of the section of the joint of the operating bar of the floor cleaning machine from FIG. 9, wherein the locking element is received in an engagement position in the receiving section; and FIG. 11 is a sectional view of the section of the joint of the operating bar of the floor cleaning machine from FIG. 9, wherein the locking element is released from the receiving section in a release position and the operating bar is pivoted to the greatest possible extent relative to the base.

Corresponding reference numerals indicate corresponding parts throughout the several views of the drawings.

DETAILED DESCRIPTION

Figure 1:
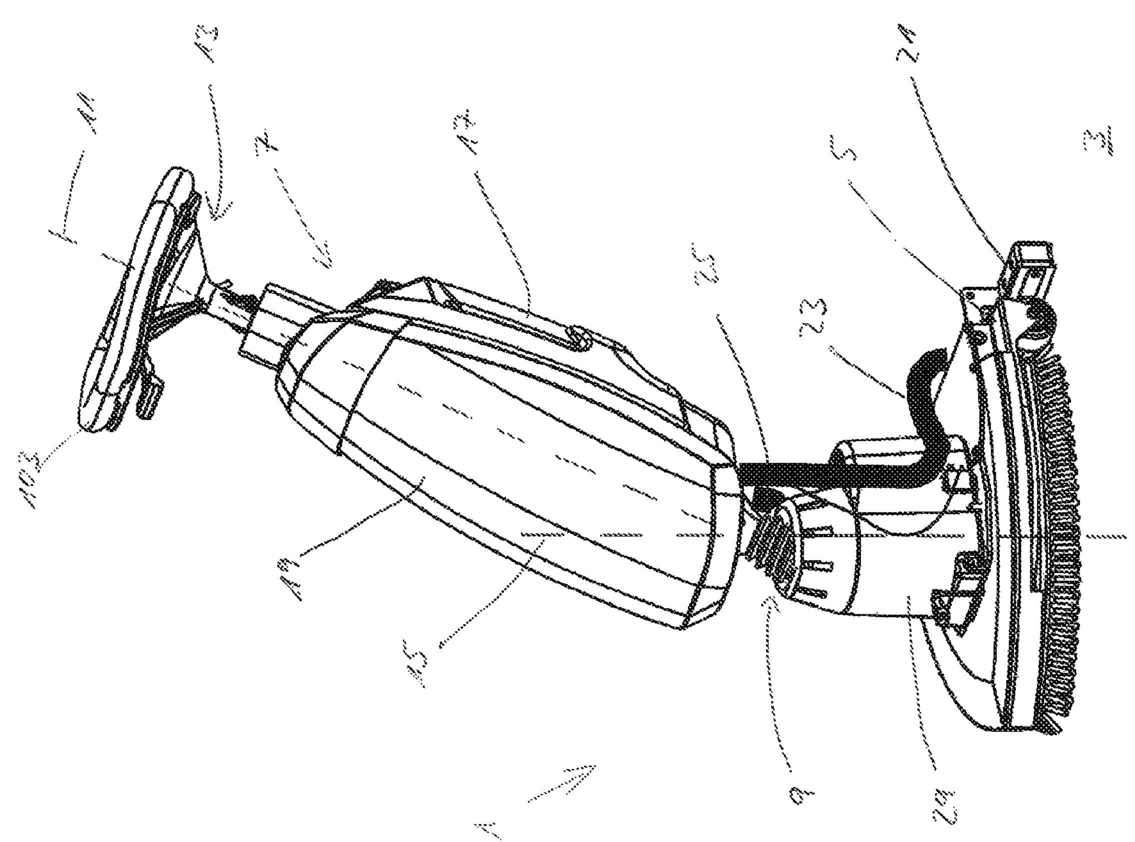
FIG. 1 is a perspective view of a first exemplary embodiment of a floor cleaning machine according to the present disclosure.

FIG. 1 illustrates a first exemplary embodiment of a floor cleaning machine 1 according to the present disclosure, which is designed here as a hand-guided scrubber dryer and is provided with a cleaning element arrangement, by means of which cleaning liquid can be applied to the floor surface 3 (see FIGS. 1 and 2) and which has cleaning elements for engagement with the floor surface 3 to be cleaned. Furthermore, the scrubbing machine is provided with a suction foot, by means of which scrubbing residues, including the cleaning liquid, can be sucked off again. The exemplary embodiments of floor cleaning machines 1 which are described here have an operating bar 7, which is attached to a base 5 of the floor cleaning machine 1 and will be described in detail below, wherein the operating bar 7 is pivotably attached to the base 5.

As already mentioned, the first exemplary embodiment of a floor cleaning machine 1 according to the disclosure described here comprises a base 5, to which an operating bar 7 is attached via a joint 9, which will be described in greater detail below. In this case, the operating bar 7 extends from the joint 9, via which it is pivotably connected to the base 5, along a longitudinal axis 11 to an actuating end 13, wherein the proximal end of the operating bar 7 is provided adjacent to the joint 9. In this case, the joint 9 is configured in such a way that, when the operating bar 7 is pivoted or rotated about the longitudinal axis 11, a torque is exerted on the base 5, with the result that the latter is pivoted about a vertical axis 15 with respect to the floor surface 3, the vertical axis 15 running perpendicularly to the floor surface 3. On account of its construction, the joint 9 therefore makes it possible for a user who grips the operating bar 7 at its actuating end 13 to be able to steer the base 5.

A cleaning liquid container 17 and a dirty water tank 19 are releasably attached to the operating bar 7 and are connected, in a manner still to be described, to the base 5 and to a suction foot 21, which is held pivotably on the base 5, via lines 23, 25. In this case, the suction foot 21 can be pivoted between the position shown in the figures, in which it is situated opposite the floor surface 3 to be cleaned, and a raised position, in which it is spaced apart from the floor surface 3.

Finally, a cleaning element arrangement 27 (see FIGS. 2 and 3), which is configured to engage with the floor surface 3 to be cleaned, is provided on the underside of the base 5, which faces the floor surface 3 to be cleaned, wherein the cleaning element arrangement 27 is driven by a drive motor 31, which is arranged in a housing 29 on the base. The drive motor 31 can be, for example, an electric motor which is supplied by a battery unit, not illustrated in the figures, which is attached to the base 5 or the operating bar 7. However, the present disclosure is not restricted to electric motors, and it is also possible, in principle, for the drive motor 31 to be driven by compressed air. This may be the case when the floor cleaning machine 1 is used as an accessory on a self-propelled machine.

Also arranged in the housing 29 of the base 5 is a suction turbine 33, the suction side of which is connected via line 25 to the upper end of the dirty water tank 19. The dirty water tank 19, in turn, is connected to the suction foot 21 via line 23. The suction turbine 33 forms a suction device, with the aid of which a suction air flow from the suction foot 21 into the dirty water tank 19 is generated, thus enabling cleaning liquid to be sucked off from the floor surface 3 to be cleaned. Additional lines 35 are furthermore provided in the base 5, via which cleaning liquid can be applied from the cleaning liquid container 17, through the base 5, into the region of the cleaning element arrangement 27 and, in the process, onto the floor surface 3 to be cleaned.

Figure 2:
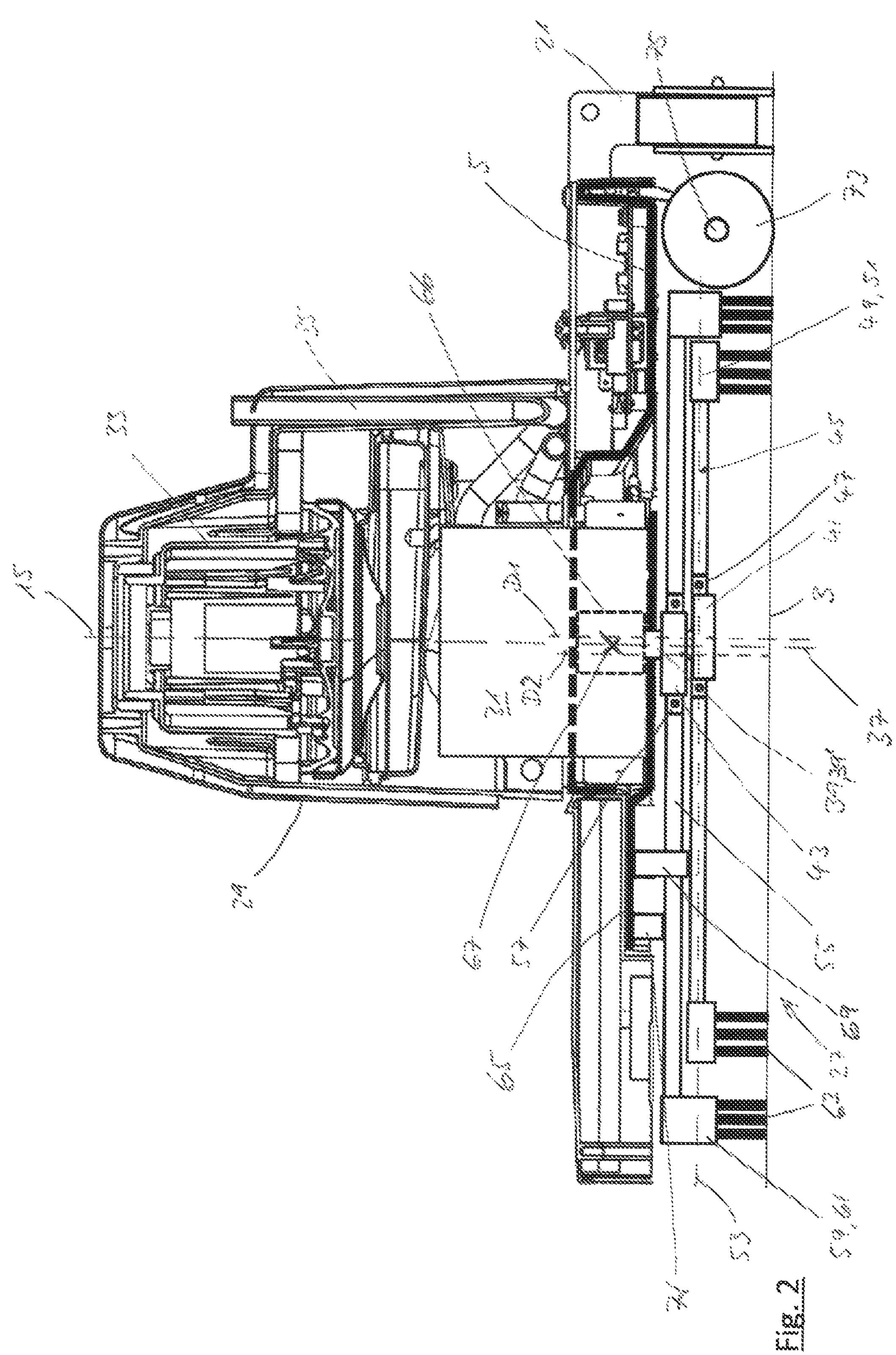
FIG. 2 is a sectional view of the base of the floor cleaning machine from FIG. 1.

As can be seen, in particular, from FIG. 2, the drive motor 31 has an output shaft 39, which extends along an output axis 37 and is driven in rotation by the drive motor 31. Mounted one behind the other on the output shaft 39 when viewed in the axial direction of the output axis 37, for conjoint rotation therewith, are a first eccentric disc 41 and a second eccentric disc 43. A first receiving element 45 is secured in a rotatable manner via a first bearing 47 on the outer circumference of the first eccentric disc 41, wherein the first receiving element 45 is connected in a fixed manner to the inner cleaning body 49 of an inner cleaning element 51. Here, the first receiving element 45 is rotatable with respect to the first eccentric disc 41 about a first axis of rotation D1, which runs parallel to the output axis 37. In this case, the inner cleaning body 49 of the inner cleaning element 51 has a first receiving opening, in which the first receiving element 45 is received. In addition, the inner cleaning body 49 extends in a cleaning body plane 53 which, during the operation of the floor cleaning machine 1, if the latter is arranged on a floor surface 3 to be cleaned, extends substantially parallel to the plane of the floor surface 3 to be cleaned.

In a similar way, a second receiving element 55 is attached in a rotatable manner via a second bearing 57 to the outer circumference of the second eccentric disc 43, wherein the second receiving element 55 is connected in a fixed manner to an outer cleaning body 59 of an outer cleaning element 61. Here, the second receiving element 55 is rotatable with respect to the second eccentric disc 43 about a second axis of rotation D2, which runs parallel to the output axis 37 and the first axis of rotation D1. In this case, the outer cleaning body 59 has a second receiving opening, in which, on the one hand, the second receiving element 55 and, on the other hand, the inner cleaning body 49 of the inner cleaning element 51 are received. Therefore, the outer cleaning body 59 surrounds the inner cleaning body 49, and the outer cleaning element 61 is arranged externally around the inner cleaning element 51. Moreover, the outer cleaning body 59, and thus the outer cleaning element 61, also extends in the cleaning body plane 53.

Both the inner cleaning body 49 and the outer cleaning body 59 are arranged in the cleaning body plane 53, i.e. at least parts both of the inner cleaning body 49 and of the outer cleaning body 59 intersect the cleaning body plane 53 when viewed in cross section. Furthermore, it can be seen from both FIG. 2 and FIG. 3 that the inner cleaning element 51 and the outer cleaning element 61 have engagement elements 63, which are secured on the respective cleaning body 49, 59, and point towards the side of the cleaning body plane 53 which faces the floor surface 3 to be cleaned. The engagement elements 63 are provided for the purpose of engaging with the floor surface 3 to be cleaned. In the exemplary embodiment described here, the cleaning elements 63 are designed as bristles. However, it is also conceivable for these to be formed by pads or the like. In general, the engagement elements 63 of the cleaning elements 51, 61 are designed in such a way that their free ends can engage with the floor surface 3 to be cleaned, the free ends of the engagement elements 63 then being arranged in a cleaning plane, which coincides with the plane of the floor surface 3 to be cleaned, during engagement with the floor surface 3.

In the exemplary embodiment described here, the first and the second eccentric disc 41, 43 are furthermore arranged in such a way that the first and the second axis of rotation D1, D2 and the output axis 37 always run in a common plane when the output shaft 39 is rotating. This is associated with the fact that the first and second eccentric discs 41, 43 are secured on the output shaft 39 in a manner offset by 180° with respect to one another.

As can also be seen from FIG. 2, the output shaft 39 has an output shaft section 39' which extends into the first and into the second receiving opening of the inner cleaning body 49 and of the outer cleaning body 59 and which furthermore also extends over the region of the output shaft 39 on which the projection of the inner or the outer cleaning body 49, 59 onto the output shaft 39 falls. It is in this region also that the first eccentric element 41 and the second eccentric element 43 are arranged one behind the other when viewed in the axial direction of the output shaft 39. Finally, the inner and outer cleaning bodies 49, 59 are constructed and secured on the output shaft 39 via the first and second eccentric discs 41, 43 and the first and second receiving elements 45, 55 in such a way that the projection of the inner cleaning body 49 onto the output shaft 39 overlaps at least partially with the projection of the outer cleaning body 59 onto the output shaft 39, thus ensuring that the axial extent of the structure comprising the two (i.e., inner and outer) cleaning bodies 49, 59 along the output axis 37 is as short as possible.

In the exemplary embodiment described here, the inner cleaning element 51 and the outer cleaning element 61 are furthermore configured in such a way that their masses are equal, and the inner cleaning element 51 and the outer cleaning element 61 have engagement surfaces which are formed by the cleaning elements 63 connected to them and by means of which they engage with the floor surface 3 to be cleaned, these engagement surfaces of the two cleaning elements 51, 61 being equal in size.

Figure 3:
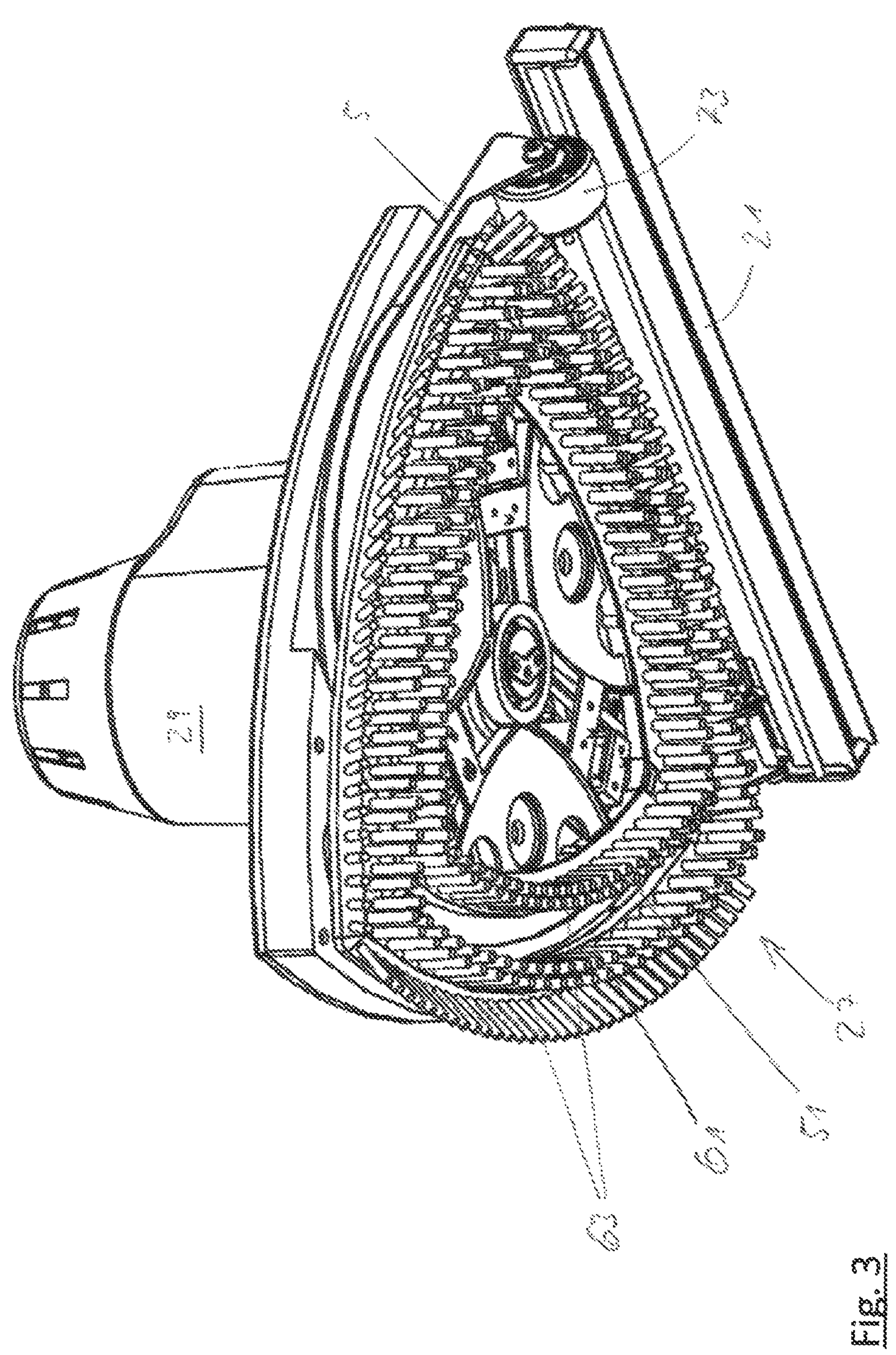
FIG. 3 is a perspective view of the floor cleaning machine from FIG. 1 from below.
Figure 4:
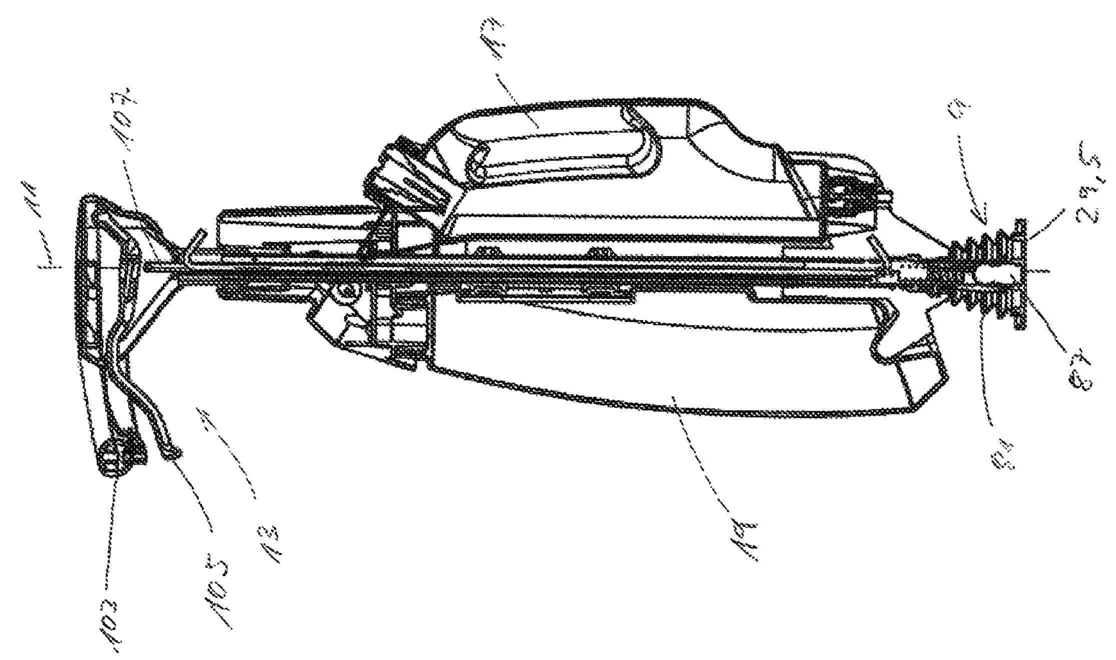
FIG. 4 is a sectional view of the section of the operating bar of the floor cleaning machine from FIG. 1.

In addition, it can be seen, especially from FIG. 3, that the outer cleaning element 51 has a triangular outer contour when viewed in the cleaning body plane 53, wherein the sides of the triangular outer contour are of convex design. Furthermore, the second receiving opening has a triangular inner contour in the cleaning body plane 53, and the inner cleaning element 51 likewise has a triangular outer contour in the cleaning body plane 53. However, the present disclosure is not restricted to the shape of the cleaning elements 51, 61 described here. On the contrary, it is also conceivable, in plan view, for the cleaning elements to be designed as triangles with straight sides, as rectangles or as trapeziums, the orientation of an optionally present tip differing relative to the preferred direction of movement of the floor cleaning machine, i.e. the tip points in the direction of movement or in an opposite direction.

FIG. 2 furthermore shows that a drive motor holding element 65, to which, in turn, the drive motor 31 is fixedly attached, is provided on the base 5. The drive motor holding element 65 is held in such a way that it can be pivoted with respect to the base 5 via elastic elements 66, wherein the drive motor holding element 65 can be pivoted relative to the base 5, in particular about a pivot axis 67 which runs parallel to the cleaning body plane 53. In addition, the pivot axis 67 runs substantially perpendicularly to a direction in which the floor cleaning machine 1 is moved forwards in normal operation. Because the drive motor holding element 65 is held pivotably on the base 5 and is fixedly connected to the drive motor 31 and thus to the cleaning element arrangement 27, the cleaning elements 51, 61 can pivot relative to the base 5 and the alignment of the cleaning elements 51, 61 can automatically adapt to the profile of the floor surface 3 without it being necessary for the user to have to pivot the base 5 to achieve this.

As can furthermore be seen from FIG. 2, first elastic elements 69 are provided, which are connected fixedly, on the one hand, to the inner cleaning body 49 via the first receiving element 45 and fixedly, on the other hand, to the drive motor holding element 65. In the same way, second elastic elements 71 are provided, which are connected fixedly, on the one hand, to the outer cleaning body 59 via the second receiving element 55 and fixedly, on the other hand, to the drive motor holding element 65. In this case, the first and second elastic elements 69, 71 are configured in such a way that, although they are fixedly connected to the drive motor holding element 65 and the respective cleaning body 49, 59, they allow a limited movement of the inner and outer cleaning bodies 49, 59 parallel to the cleaning body plane 53.

When the drive motor 31 is switched on and the output shaft 39 rotates, the inner cleaning body 49 and the outer cleaning body 59, and thus the inner cleaning element 51 and the outer cleaning element 61, are set in an eccentric movement about the output axis 37. Such an eccentric movement is distinguished by the fact that, when viewed perpendicularly to the cleaning body plane 53, each point of the cleaning element 51 and of the second cleaning element 61 moves substantially circularly about an axis which runs parallel to the output axis 37, but the axes for points which do not coincide, when viewed perpendicularly to the cleaning body plane 53, are different from one another. For each cleaning element 51, 61, the situation is such that, during such an eccentric movement, all points of the cleaning element 51, 61 move in a single direction of movement at any point in time, when viewed perpendicularly to the cleaning body plane 53.

Owing to the arrangement of the first and second axis of rotation D1, D2 in a common plane together with the output axis 37 or the offset of the first and second eccentric discs 41, 43 by 180°, the eccentric movements of the inner cleaning element 51 and of the outer cleaning element 61 are phase-shifted with respect to one another in such a way that, when viewed perpendicularly to the cleaning body plane 53, the direction of movement of the points of the inner cleaning element 51 is opposite to the direction of movement of the points of the outer cleaning element 61 at any point in time. The eccentric movements are thus 180° phase-shifted with respect to one another.

Since the inner and outer cleaning bodies 49, 59 are connected to the drive motor holding element 65 via the first and second elastic elements 69, 71, and therefore can only perform a movement to a small extent relative to the drive motor holding element 65, the movement of the inner and outer cleaning bodies 49, 59 is restricted to the above-described eccentric movement, and the inner and outer cleaning bodies 49, 59 cannot also rotate about their respective axes of rotation D1, D2 relative to the base 5.

In addition, the masses and the engagement surfaces of the inner and outer cleaning elements 51, 61 are equal in size, which, together with the always opposite movement of the inner and outer cleaning elements 51, 61 results overall in the forces and torques generated as a result of the movement of the inner and outer cleaning elements 51, 61 cancelling each other out and no resultant forces acting on the base 5.

Finally, it can be seen from the figures that guide wheels 73, which are rotatable about a common wheel axis 75, are held on the base 5. This wheel axis 75 runs parallel to the pivot axis 67 and thus likewise parallel to the cleaning body plane 53 and perpendicularly to the direction in which the floor cleaning machine 1 is moved over the floor surface 3 to be cleaned in normal operation. When the guide wheels 73 are resting on the floor surface 3 to be cleaned, the floor cleaning machine 1 can be moved comfortably along the direction defined by the wheel axis 75 without a user having to exert large forces on the operating bar 7. In this case, the guide wheels 73 can be attached to the base 5 at a height such that they rest on the floor surface 3 to be cleaned only if a corresponding force is exerted on the base 5 by means of the operating bar 7, as a result of which the base 5 is pivoted about the pivot axis 67 with respect to the drive motor holding element 65. In the case of such an arrangement of the guide wheels 73, the user determines whether the machine should execute a rectilinear movement or be moved without the guide wheels 73 coming into contact with the floor surface 3.

In the following, the construction of the joint 9 of the first exemplary embodiment will now be described with reference to FIGS. 4 to 8, wherein the joint 9 couples the base 5 to the operating bar 7, with the result that the operating bar 7 can be pivoted relative to the base 5, but at the same time control of the base 5 is possible, i.e. a torque about the vertical axis 15 can be exerted on the base 5 by means of the operating bar 7.

In the first exemplary embodiment described here, the joint 9 comprises a sleeve-shaped bellows 81, which has a first end 83 and a second end 85, wherein the first end 83 is fastened to the base 5 and, in the exemplary embodiment described here, to the housing 29 provided on the base 5, while the second end 85 is fastened to the proximal end of the operating bar 7. The sleeve-shaped bellows 81 surrounds a first supporting element 87, which is fastened to the base 5 or to the housing 29 attached thereto and the free end of which has a convex spherical shell-shaped projection 89. In this case, the first supporting element 87 points away from the base 5. Furthermore, at least a section of a second supporting element 91 is accommodated in the interior of the bellows 81, and, in the present first exemplary embodiment, said element is mounted movably on the operating bar 7 and has, at its free end, a concave spherical shell-shaped receiving recess 93. Here, the second supporting element 91 points away from the actuating end 13 of the operating bar 7. In this case, the receiving recess 93 is adapted in such a way that the convex spherical shell-shaped projection 89 of the first supporting element 87 can be received in it. In particular, the projection 89 and the receiving recess 93 in the preferred first exemplary embodiment described here are designed in such a way that the projection 89 rests over an extended area against the receiving recess 93. However, other configurations are also conceivable. Furthermore, it is also possible for a convex projection to be provided on the second supporting element, while a concave receiving recess is formed on the first supporting element.

Figure 5:
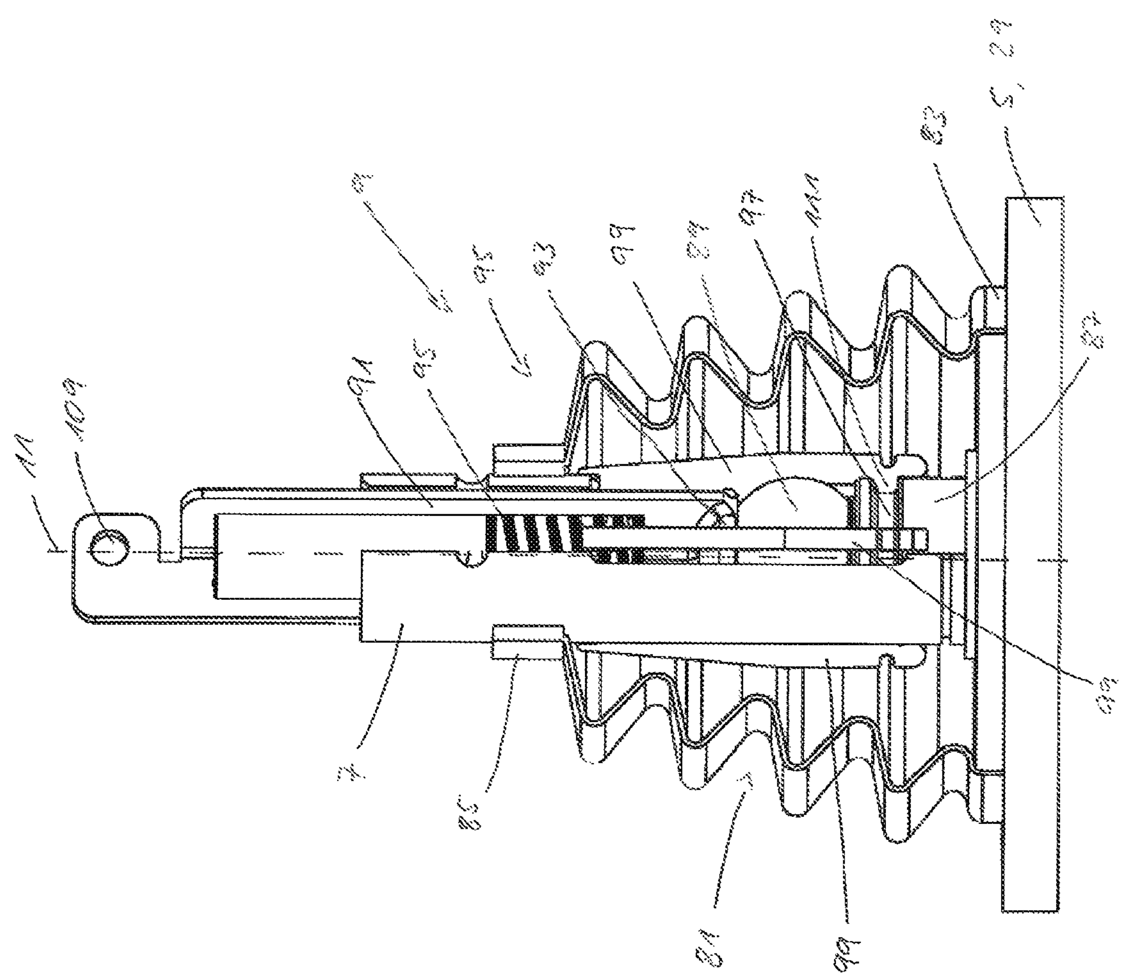
FIG. 5 is a sectional view of the region of the joint between the base and the operating bar of the floor cleaning machine from FIG. 1, the locking elements being in the engagement position and engaging with the receiving sections.

As can furthermore be seen in FIG. 5, in which only the proximal end of the operating bar 7 is shown, the second supporting element 91 is preloaded by a spring 95, one end of which is supported on the operating bar 7, while the other end thereof is supported on the second supporting element 91, in a direction away from the actuating end 13 and thus towards the first supporting element 87. As can furthermore be seen in FIG. 5, the first supporting element 87 and thus the base 5 or housing 29 has a receiving section in the form of a circumferential groove 97, which in this exemplary embodiment is formed below the spherical shell-shaped projection 89 and runs around the first supporting element 87.

Figure 6:
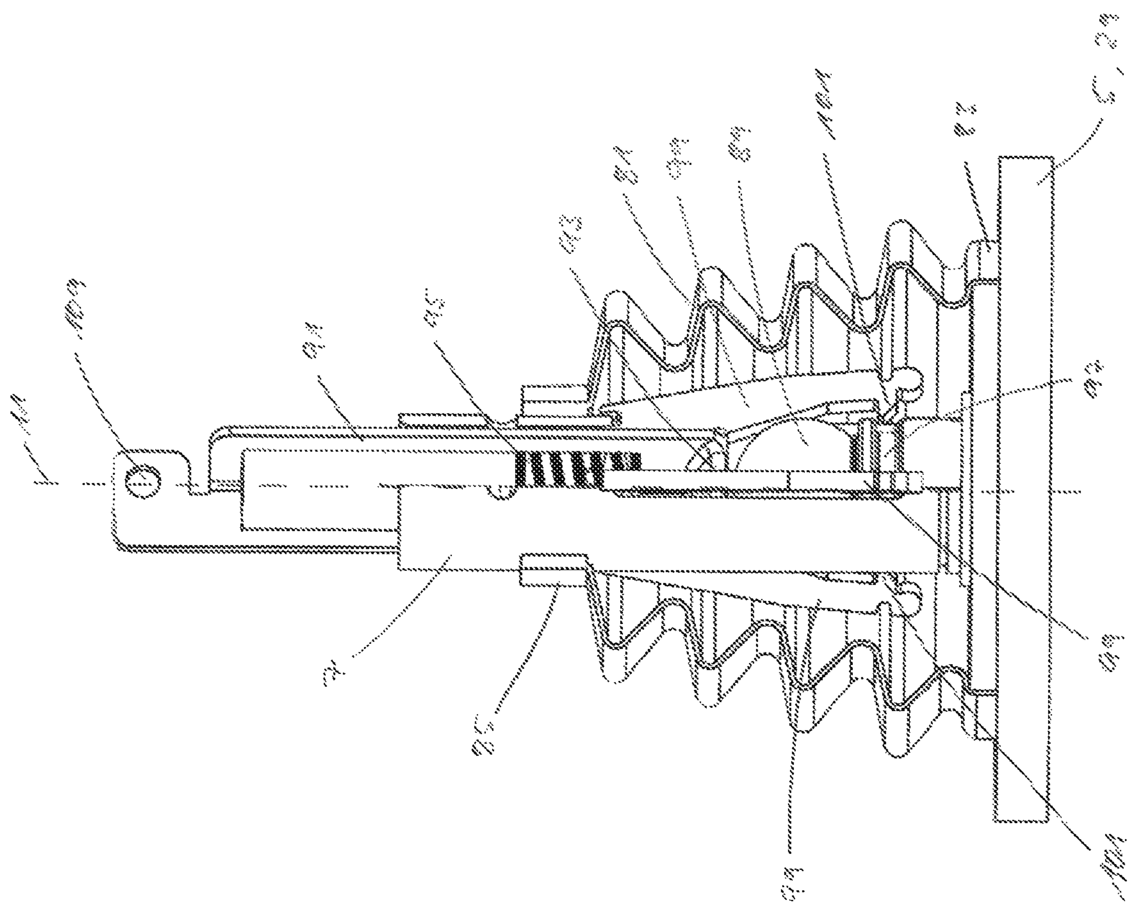
FIG. 6 is a sectional view of the region of the joint between the base and the operating bar of the floor cleaning machine from FIG. 1, the locking elements being in the release position.

FIG. 5 furthermore shows that, at the proximal end of the operating bar 7, locking elements 99 are provided, which can be pivoted relative to the operating bar 7 between an engagement position shown in FIG. 5 and a release position shown in FIG. 6, thus enabling them to move transversely with respect to the longitudinal axis 11 of the operating bar 7. When the locking elements 99 are in the engagement position, they engage with the circumferential groove 97 (FIG. 5) when the operating bar 7 is in the axial position shown in FIGS. 5 and 6, in which latching noses 101 on the locking elements 99 are situated opposite the circumferential groove 97.

When the locking elements 99 are in the engagement position and engage with the receiving section in the form of the groove 97, as shown in FIG. 5, the longitudinal axis 11 of the operating bar 7 extends perpendicularly to the cleaning plane or the plane in which the floor surface 3 to be cleaned extends in the first exemplary embodiment described here. Moreover, when the locking elements 99 engage by means of their latching noses 101 in the circumferential groove 97, the operating bar 7 is locked with respect to the base 5 in such a way that it is prevented from moving and, in particular, from pivoting relative to the base 5. However, when the locking elements 99 are in the release position, the operating bar 7 can be pivoted relative to the base 5, as will be described further below.

As has already been mentioned, the second supporting element 91 with the receiving recess 93 provided thereon can be moved along the longitudinal axis 11 of the operating bar 7 against the action of a spring 95, it being possible for the second supporting element 91 to be moved between a first position, which is further away from the actuating end 13 and is shown in FIG. 5, and a second position, which is shown in FIG. 6 and is closer to the actuating end 13. In this case, the second supporting element 91 is designed and arranged in such a way that, during the movement out of the first position (see FIG. 5) into the second position (see FIG. 6), it engages with the locking elements 99 in such a way that it moves them outwards in the radial direction with respect to the longitudinal axis 11 of the operating bar 7 and thus transversely with respect to the longitudinal axis 11 out of the engagement position into the release position. For this purpose, the free end of the second supporting element 91 engages with the locking elements 99 or moves along them, with the result that these are pivoted outwards.

In order to move the second supporting element 91 from the first to the second position against the action of the spring 95, an actuating element 105 in the form of a lever, which can be pivoted, is provided on the actuating end 13 of the operating bar 7, adjacent to a handle element 103, wherein the actuating element 105 is connected via an actuating rod 107 to the end of the second supporting element 91 which is closest to the actuating end 13 of the operating bar 7. For this purpose, one end of the actuating rod 107 engages in a hole 109 at this end of the second supporting element 91. The pivoting movement of the actuating element 105 thereby causes the second supporting element 91 to move between the first and the second position. In this way, the locking elements 99 are coupled to the actuating element 105 via the second supporting element 91 in order to bring about a movement of the locking elements 99 between the engagement position and the release position.

Finally, the bellows 81 is configured as a preloading means, for example by having a steel wire which preloads the first and second ends 83, 85 away from one another, with the result that, when the locking elements 99 with the latching noses 101 provided thereon are arranged opposite the circumferential groove 97, a force is exerted on the operating bar 7, which forces this away from the base 5 into a position in which the latching noses 101 are at a distance from the groove 97, when viewed along the longitudinal axis 11 of the operating bar 7.

Figure 7:
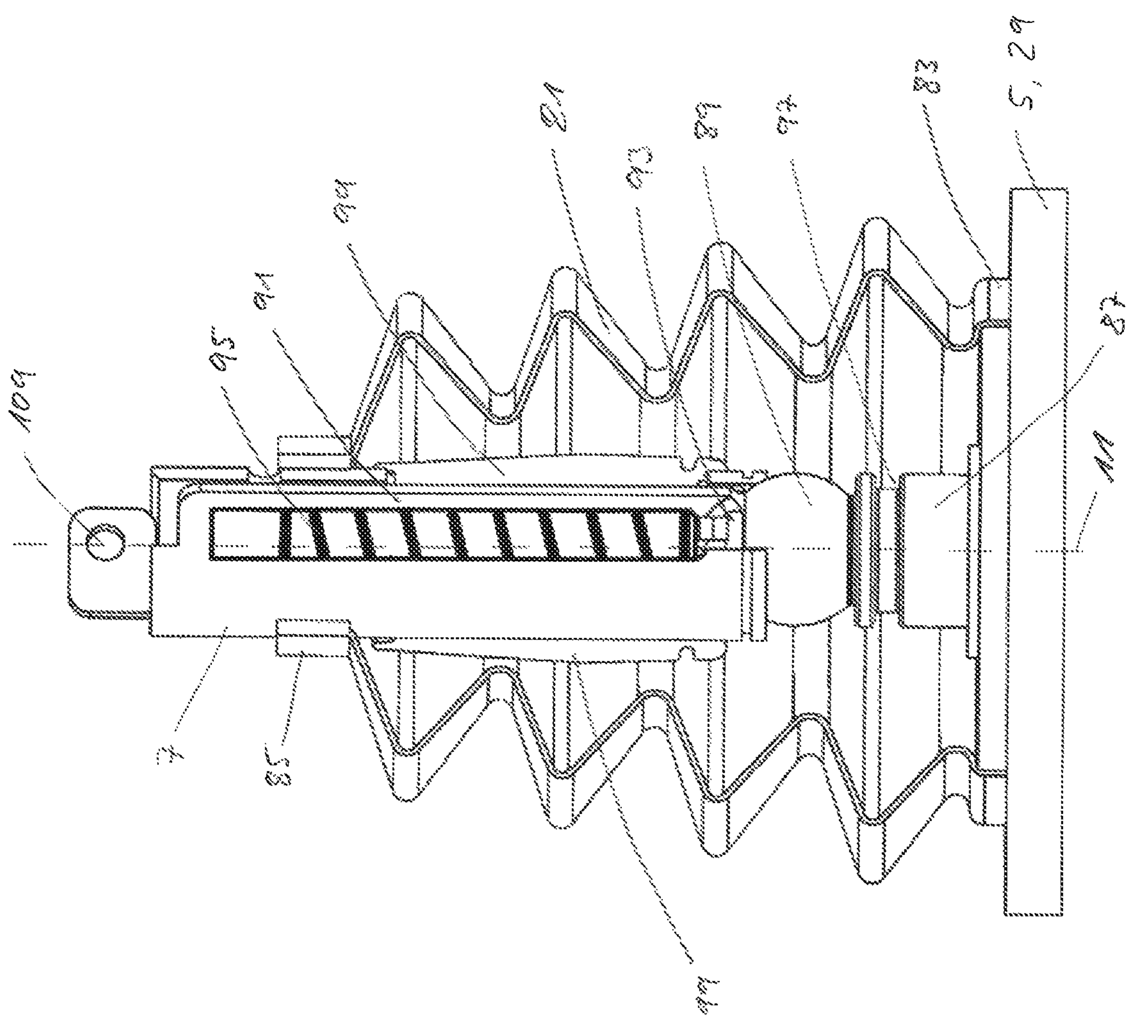
FIG. 7 is a sectional view of the region of the joint between the base and the operating bar of the floor cleaning machine from FIG. 1, the locking elements being in the engagement position and at a distance from the receiving sections.
Figure 8:
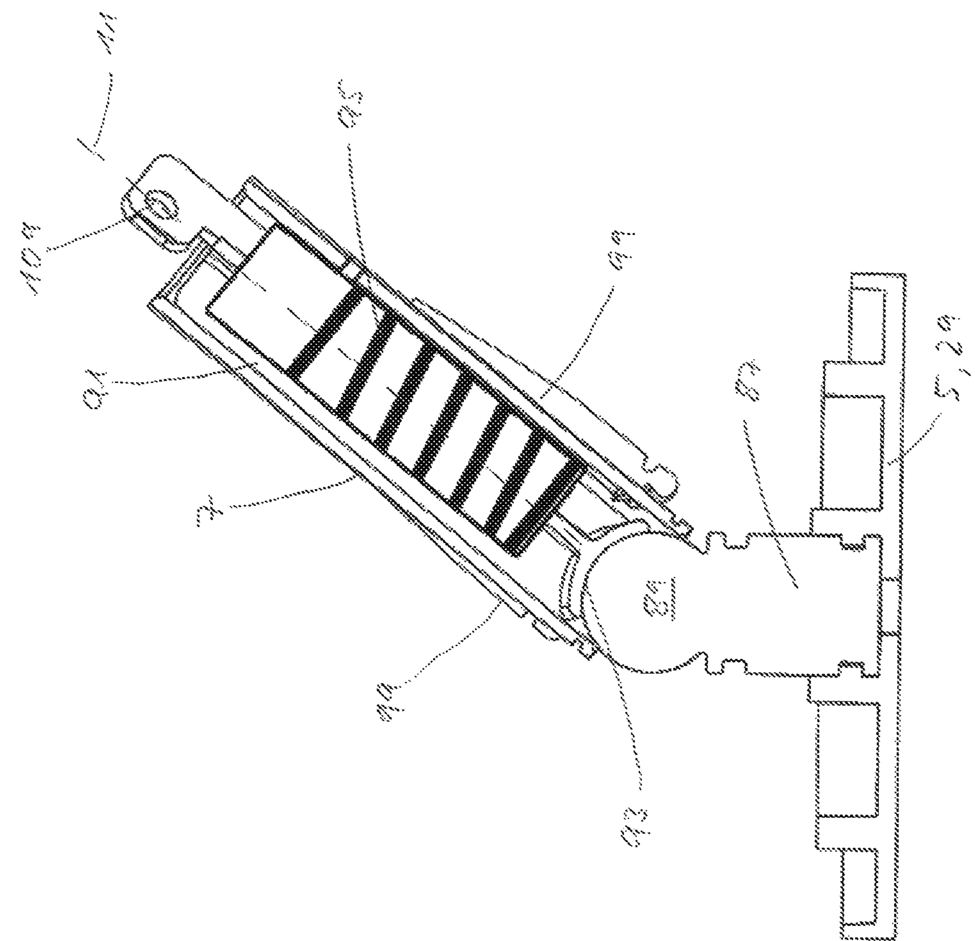
FIG. 8 is a sectional view of the region of the joint between the base and the operating bar of the floor cleaning machine from FIG. 1, the operating bar being pivoted relative to the base.

In order to operate the above-described first exemplary embodiment of a floor cleaning machine 1, the operating bar 7 on this machine must first be released, i.e. the locking of the joint 9 must be released. For this purpose, a user pulls the actuating element 105 towards the handle element 103 at the actuating end 13 of the operating bar 7, with the result that the actuating rod 107 is moved along the longitudinal axis 11 of the operating bar 7 towards the actuating end 13, as a result of which, in turn, the second supporting element 91 is moved relative to the operating bar 7 out of the first position shown in FIG. 5 into the second position shown in FIG. 6. Since the free end of the second supporting element 91 engages with the locking elements 99 on the operating bar 7, the locking elements 99 are pivoted out of the engagement position shown in FIG. 5, in which latching noses 101 on the locking elements 99 engage with the circumferential groove 97 on the first supporting element 87, into the release position, which is shown in FIG. 6 and in which the latching noses 101 are no longer in engagement with the groove 97. This, in turn, has the effect that the preloading force of the bellows 81 leads to the operating bar 7 as a whole being moved away from the base 5 in the vertical direction, as illustrated in FIG. 7. As a result of this movement of the operating bar 7 as a whole away from the base 5, the second supporting element 91 can move, as a result of the preloading of the spring 95, relative to the operating bar 7, towards the first supporting element 87 in the direction of the first position, the receiving recess 93 coming to bear against the spherical shell-shaped projection 89, with the result that the free end of the second supporting element 91 bears against the first supporting element 87 and is guided thereon. As a result of the preloading by the bellows 81 and the spring 95, on the other hand, the operating bar 7 moves as a whole away from the base 5, but the preloading of the spring 95 has the effect that, after the locking elements 99 have been released, the second supporting element 91 once again moves towards the first supporting element 87, and the projection 89 and the receiving recess 93 come into engagement with one another. In this case, the operating bar 7 is guided during a pivoting movement by virtue of this engagement between the projection 89 and the receiving recess 93, as can be seen, in particular, in FIG. 8.

During the further operation of the above-described first exemplary embodiment, after the operating bar 7 has been released in the above-described manner, thus enabling it to be pivoted relative to the base 5, cleaning liquid is applied to the floor surface 3 to be cleaned from the cleaning liquid container 17 via the line 35, while the drive motor 31 is simultaneously in operation, with the result that the inner and outer cleaning elements 51, 61 are driven to perform an eccentric movement, during which the engagement elements 63 engage with the floor surface 3 to be cleaned and clean the latter together with the applied cleaning liquid. Because of the eccentric movement of the inner and outer cleaning elements 51, 61, which is phase-shifted by 180°, no resultant forces, in particular about the vertical axis 15, are exerted on the base 5. As a result, a user can guide the floor cleaning machine 1 in a simple manner by means of the operating bar 7. Since the joint 9 is configured in the manner already described, the user can also easily change the orientation of the base 5 by rotating the operating bar 7 about its longitudinal axis 11 by means of the handle element 103. As already described, when the joint 9 is released and the operating bar 7 can be freely pivoted relative to the base 5, the receiving opening 93 rests against the projection 89, with the result that, during a pivoting movement of the operating bar 7 relative to the base 5, the operating bar 7 is guided on the base 5 and force transmission does not take place solely via the bellows 81. This enables forces acting in the axial direction of the operating bar 7 to be transferred to the base 5 in an effective manner by the user. Moreover, the guidance due to the engagement of the projection 89 with the receiving opening 93 has the effect that a resistance is opposed to an axial movement of the operating bar 7 towards the base 5.

Since the inner and outer cleaning bodies 49, 59, and especially the outer cleaning body 59, are of triangular configuration, the floor cleaning machine 1 can also be moved effectively into angled regions. Moreover, during operation, cleaning liquid is sucked up again from the floor surface 3 to be cleaned via the suction foot 21 as a result of the suction air flow generated by the suction turbine 33, when the floor cleaning machine 1 is moved over the floor surface 3. This cleaning liquid laden with dirt is collected in the dirty water tank 19.

Since the arrangement comprising the drive motor 31 and the inner and outer cleaning elements 51, 61 has only a very short overall length when viewed in the axial direction of the output axis 37, the base 5 of the floor cleaning machine has only a very low height, and the floor cleaning machine 1 can also be moved into regions in which the space is severely limited in the vertical direction if the operating bar 7 is pivoted sharply relative to the vertical. The drive of the inner and outer cleaning elements 51, 61 is therefore associated with a very small overall size, and this greatly extends the possible uses of the floor cleaning machine 1 according to the disclosure. By virtue of the type of drive with which an eccentric movement of the inner and outer cleaning elements 51, 61 is generated, which are preferably phase-shifted by 180°, it is additionally ensured that a uniform cleaning effect is achieved over the entire area in which the inner and outer cleaning elements 51, 61 are in engagement with the floor surface 3 to be cleaned and, on the other hand, that no resultant torques are exerted on the base 5 of the floor cleaning machine 1.

If the first exemplary embodiment of a floor cleaning machine according to the disclosure is no longer to be operated or operation is to be interrupted, the operating bar 7 is pivoted in such a way that its longitudinal axis 11 extends perpendicularly to the cleaning plane or to the floor surface 3 to be cleaned, and then the operating bar 7 is pushed towards the base 5 counter to the preloading due to the steel spring in the bellows 81. In this case, the locking elements 99 are first pushed apart as a result of the engagement with the projection 89 and then engage again by means of their latching noses 101 into the groove 97, thereby locking the operating bar 7 in the vertical position. During this movement, the second supporting element 91 can be pushed towards the actuating end 13 of the operating bar 7 against the preloading by the spring 95. As a result, the position of the joint 9 which is shown in FIG. 5, in which the second supporting element 91 occupies its first position, is then again reached.

In the exemplary embodiment described above, the floor cleaning machine 1 has, in addition to a battery unit, a suction turbine 33, a cleaning liquid container 17 and a dirty water tank 19. However, it is also conceivable for the floor cleaning machine 1 with the above-described construction of the drive for the inner and outer cleaning elements 51, 61 to be used together with a further floor cleaning machine, which is of self-propelled design, and for the latter to supply the drive motor 31 and to feed in cleaning liquid, and for the suction device which is present thereon for sucking up cleaning liquid to be used to produce a suction air flow in the suction foot. Thus, it is not necessary for a battery unit, a suction turbine, a cleaning liquid container and a dirty water tank to be provided.

A second exemplary embodiment of a floor cleaning machine according to the disclosure is described below with reference to FIGS. 9 to 11, wherein the floor cleaning machine according to the second exemplary embodiment differs from that according to the first exemplary embodiment only with regard to the construction of the joint 9, while the other parts are of substantially identical design, and therefore attention is drawn in respect of these to the description of the first exemplary embodiment.

In the floor cleaning machine according to the second exemplary embodiment, the joint 9 likewise has a bellows 81, the first end 83 of which is fastened to the base 5 or housing 29 which surrounds the drive motor 31. In addition, the bellows 81 has a second end 85, which is fastened to the operating bar 7 in the region of the proximal end of the latter, wherein, in this case too, this extends along a longitudinal axis 11 (see, in particular, FIG. 11).

As can furthermore be seen, in particular, from FIG. 9, it is also the case in the second exemplary embodiment that a handle element 103 is provided at the actuating end 13 of the operating bar 7, which is illustrated only partially and, in particular, without the cleaning liquid container 17 and the dirty water tank 19 in FIG. 9, adjacent to which handle element an actuating element 105 is provided which, in this case too, is designed as a lever and is coupled to an actuating rod 107. The actuating rod 107 extends along the longitudinal axis 11 of the operating bar 7 from the actuating end 13 to the proximal end.

As can also be seen from FIGS. 10 and 11, a first supporting element 87, which, in this exemplary embodiment too, is designed as a convex spherical shell-shaped projection 89, is provided on the base 5 or housing 29. In this exemplary embodiment, the projection 89 has a recess 111 which faces away from the base 5 or housing 29 and, in the exemplary embodiment shown here, extends substantially perpendicularly to the cleaning plane or the plane of the floor surface 3 to be cleaned when the floor cleaning machine with the inner and outer cleaning elements is arranged on the floor surface.

As can furthermore be seen from FIGS. 10 and 11, a second supporting element 91 is provided at the proximal end of the operating bar 7, which second supporting element has a concave spherical shell-shaped receiving recess 93 which faces away from the operating bar 7 and is dimensioned and designed to receive the projection 89 of the first supporting element 87. Furthermore, the receiving recess 93 is dimensioned in such a way and extends to such an extent around the projection 89 that the second supporting element 91 cannot be removed from the projection 89 solely by an axial movement in the direction of the longitudinal axis 11 of the operating bar 7. On the contrary, a form fit prevents such a movement in this direction.

As can finally also be seen from FIGS. 10 and 11, a locking element 99, which can be moved along the longitudinal axis 11, is provided at the proximal end of the operating bar 7, being connected to the actuating rod 107, thus ensuring that a movement of the actuating element 105 leads to an axial movement of the locking element 99 along the longitudinal axis 11 of the operating bar 7.

When the locking element 99 is in the engagement position shown in FIG. 10 and engages with the recess 111 in the projection 89 of the first supporting element 87, the operating bar 7 is locked with respect to the base 5 and, in particular, cannot carry out a pivoting movement relative thereto, whereas, when the locking element 99 assumes the release position shown in FIG. 11, such a pivoting movement of the operating bar 7 is possible.

In this second exemplary embodiment of a floor cleaning machine according to the disclosure too, the first supporting element 87 and the second supporting element 91 are guided on one another. However, a torque, in particular in the direction of the longitudinal axis 11 of the operating bar 7, is not transmitted by this guide; instead, the bellows 81 is provided for this purpose in this exemplary embodiment too. However, the guidance of the two supporting elements 87, 91 on one another has the effect that a force acting in the axial direction of the operating bar 7 along the longitudinal axis 11 can be transmitted to the base 5. Moreover, in this exemplary embodiment, the bellows 81 is configured in such a way that it exerts a torque on the operating bar 7, which torque drives the latter in the direction of a position in which the longitudinal axis 11 of the operating bar 7 drives substantially perpendicularly to the cleaning plane or the plane of the floor surface 3 to be cleaned when the machine with the inner and outer cleaning elements is arranged on the floor surface.

In this exemplary embodiment, when starting up the floor cleaning machine, the locking element 99 can first be released from the recess 111 by pivoting the actuating element 105, so that then the operating bar 7 can be pivoted freely relative to the base 5, as is necessary in the already described operation of the floor cleaning machine. If operation is to be terminated or interrupted, the operating bar 7 can be pivoted back into the vertical position, in which it is possible for the locking element 99 to be moved out of the release position (see FIG. 11) into the recess 111 and thus brought into the engagement position in order subsequently to prevent a pivoting movement of the operating bar 7 relative to the base 5. Thus, in this exemplary embodiment too, it is the case that, during a pivoting movement, the operating bar 7 is guided by two surfaces which bear against one another, making it possible, on the one hand, to transmit axial forces and, on the other hand, to improve the controllability of the base 5.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

LIST OF REFERENCE SIGNS

| | |
|---|---|
| 1 | floor cleaning machine |
| 3 | floor surface |
| 5 | base |
| 7 | operating bar |
| 9 | joint |
| 11 | longitudinal axis |
| 13 | actuating end |
| 15 | vertical axis |
| 17 | cleaning liquid container |
| 19 | dirty water tank |
| 21 | suction foot |
| 23 | line |
| 25 | line |
| 27 | cleaning element arrangement |
| 29 | housing |
| 31 | drive motor |
| 33 | suction turbine |
| 35 | line |
| 37 | output axis |
| 39 | output shaft |
| 39' | output shaft section |
| 41 | first eccentric disc |
| 43 | second eccentric disc |
| 45 | first receiving element |
| 47 | first bearing |
| 49 | inner cleaning body |
| 51 | inner cleaning element |
| 53 | cleaning body plane |
| 55 | second receiving element |
| 57 | second bearing |
| 59 | outer cleaning body |
| 61 | outer cleaning element |
| 63 | engagement element |
| 65 | drive motor holding element |
| 66 | elastic element |
| 67 | pivot axis |

-continued

| | |
|---|---|
| 69 | first elastic elements |
| 71 | second elastic elements |
| 73 | guide wheel |
| 75 | wheel axle (cut off at the right edge of the image in the mail attachment) |
| 81 | bellows |
| 83 | first end |
| 85 | second end |
| 87 | first supporting element |
| 89 | projection |
| 91 | second supporting element |
| 93 | receiving recess |
| 95 | spring |
| 97 | groove |
| 99 | locking element |
| 101 | latching nose |
| 103 | handle element |
| 105 | actuating unit |
| 107 | actuating rod |
| 109 | hole |
| 111 | recess |

What is claimed is:

1. A floor cleaning machine comprising:

a base, and an operating bar, wherein the base has an arrangement of bristles with at least one driven bristle mount, on which bristles are provided, wherein the at least one driven bristle mount is configured to engage, by the bristles provided thereon, with a floor surface to be cleaned, with the result that, when the bristles engage with the floor surface, free ends of the bristles arranged in a cleaning plane, wherein the operating bar extends along a longitudinal axis between a proximal end and an actuating end and is pivotably attached to the base via a joint in such a way that it can be pivoted in any desired direction relative to the base, wherein the joint is configured in such a way that a torque is exerted on the base when the operating bar is rotated about its longitudinal axis, said torque being oriented in such a way as to cause the base to pivot about a vertical axis which runs perpendicularly to the cleaning plane, wherein the joint comprises a sleeve-shaped bellows, which extends between a first and a second end, the first end of which is connected to the base and the second end of which is connected to the operating bar, a first support, which is arranged inside the bellows and is attached to the base, pointing away therefrom such that the first support is a protrusion that the bellows wraps around, and a second support, which is arranged inside the bellows and is attached to the proximal end of the operating bar, pointing away therefrom such that the second support is a protrusion that the bellows wraps around, wherein the free end of one of the first and second supports has a convex spherical shell-shaped projection and the free end of the other of the first and second supports has a concave spherical shell-shaped receiving recess, and wherein the receiving recess is designed to receive the projection and to guide it for a pivoting movement.

2. The floor cleaning machine of claim 1, wherein the first support has the convex spherical shell-shaped projection, and the second support has the concave spherical shell-shaped receiving recess.

3. The floor cleaning machine of claim 1, wherein at least one lock is provided on the operating bar, the at least one lock being movable relative to the operating bar between an engagement position and a release position, wherein a receiving section connected to the base is provided, and wherein the lock and the receiving section are configured such that, in the engagement position, the at least one lock is engageable with the receiving section in a manner such that the operating bar is locked relative to the base and is prevented from moving relative to the base, and that, in the release position of the at least one lock, the operating bar is movable relative to the base.

4. The floor cleaning machine of claim 3, wherein when the at least one lock engages with the receiving section, the longitudinal axis of the operating bar runs perpendicular to the cleaning plane.

5. The floor cleaning machine of claim 3, wherein the operating bar has an actuating element at the actuating end, wherein the actuating element is coupled to the at least one lock in such a way that the at least one lock is moved from the engagement position into the release position by a movement of the actuating element.

6. The floor cleaning machine of claim 3, wherein the at least one lock is movable relative to the operating bar, transversely with respect to the longitudinal axis of the operating bar, between the engagement position and the release position.

7. The floor cleaning machine of claim 3, wherein the second support is attached to the operating bar in such a way as to be movable in the direction of the longitudinal axis between a first position and a second position and engages with the at least one lock in such a way that the at least one lock is moved out of the engagement position into the release position when the second support moves out of the first position into the second position.

8. The floor cleaning machine of claim 5, wherein the actuator is connected to the second support, thus enabling the second support to be moved out of a first position into a second position by a movement of the actuator.

9. The floor cleaning machine of claim 7, wherein the second support is further away from the actuating end of the operating bar in the first position than in the second position.

10. The floor cleaning machine of claim 7, wherein the second support is preloaded along the longitudinal axis in a direction away from the actuating end into the first position, and wherein a first spring is provided, which preloads the first and second ends of the bellows away from one another.

11. The floor cleaning machine of claim 1, wherein the projection is received in the receiving recess in such a way that the second support is prevented from moving away from the first support in a predetermined direction.

12. The floor cleaning machine of claim 11, wherein a lock, which is movable along the longitudinal axis of the operating bar between an engagement position and a release position, is provided on the operating bar, wherein the receiving section is provided as a recess, facing away from the base, in the projection, which recess is designed to receive the lock when the latter is in the engagement position, wherein, in the engagement position, the lock locks the operating bar relative to the base and prevents movement relative to the base.

13. The floor cleaning machine of claim 12, wherein an actuator is coupled to the lock in such a way that actuation of the actuator brings about a movement of the lock along the longitudinal axis towards the actuating end.

14. The floor cleaning machine of claim 11, wherein a second spring is provided, which subject the operating bar to a force which drives the operating bar into a position in which the longitudinal axis runs perpendicularly to the cleaning plane.

15. The floor cleaning machine of claim 11, wherein the predetermined direction is in the direction of the longitudinal axis of the operating bar.

* * * * *